United States Patent

Riser

Patent Number: 5,708,737
Date of Patent: Jan. 13, 1998

[54] MULTIPORT ILLUMINATOR MECHANICAL DESIGN FOR MACRO-FIBERS

[75] Inventor: Andrew P. Riser, Capistrano Beach, Calif.

[73] Assignee: Remote Source Lighting International, San Juan Capistrano, Calif.

[21] Appl. No.: 645,325

[22] Filed: May 13, 1996

Related U.S. Application Data

[63] Continuation-in-part of Ser. No. 599,970, Feb. 14, 1996, which is a continuation-in-part of Ser. No. 459,613, Jun. 2, 1995, Pat. No. 5,706,376, which is a continuation-in-part of Ser. No. 374,163, Jan. 17, 1995, Pat. No. 5,559,911.

[51] Int. Cl.⁶ .................................................. G02B 6/32
[52] U.S. Cl. .......................... 385/31; 385/33; 385/34; 385/35; 385/47; 385/92; 385/93; 385/901; 362/32
[58] Field of Search ........................... 385/31, 33, 34, 385/47, 92, 93, 901, 35; 362/32

[56] References Cited

U.S. PATENT DOCUMENTS

| | | | |
|---|---|---|---|
| 4,050,784 | 9/1977 | Kobayashi | 385/34 X |
| 4,389,698 | 6/1983 | Cibie | 362/32 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport et al. | 385/32 |
| 5,259,056 | 11/1993 | Davenport et al. | 385/115 |
| 5,367,590 | 11/1994 | Davenport et al. | 385/901 X |
| 5,396,571 | 3/1995 | Saadatmanesh et at. | 385/33 |
| 5,559,911 | 9/1996 | Forknev et al. | 385/33 |

FOREIGN PATENT DOCUMENTS 2098311  11/1982  United Kingdom ............ 385/901 X

*Primary Examiner*—Phan T. H. Palmer
*Attorney, Agent, or Firm*—Donald E. Stout

[57] ABSTRACT

The inventive system, which is used in transmitting illumination from a central source to a variety of remote locations, efficiently couples the light originating from an arc lamp, or similar source, into a multiplicity of flexible macroscopic fibers. The combination of the several elements of the inventive system results in a very efficient transfer of the energy of the light source to the fibers. A first module houses the arc lamp, and a second module generally houses the optics for coupling light to the flexible macroscopic fibers. The second module is thermally insulated from the first module, to thereby prevent high temperatures from leaking from the first module into the second module.

21 Claims, 3 Drawing Sheets

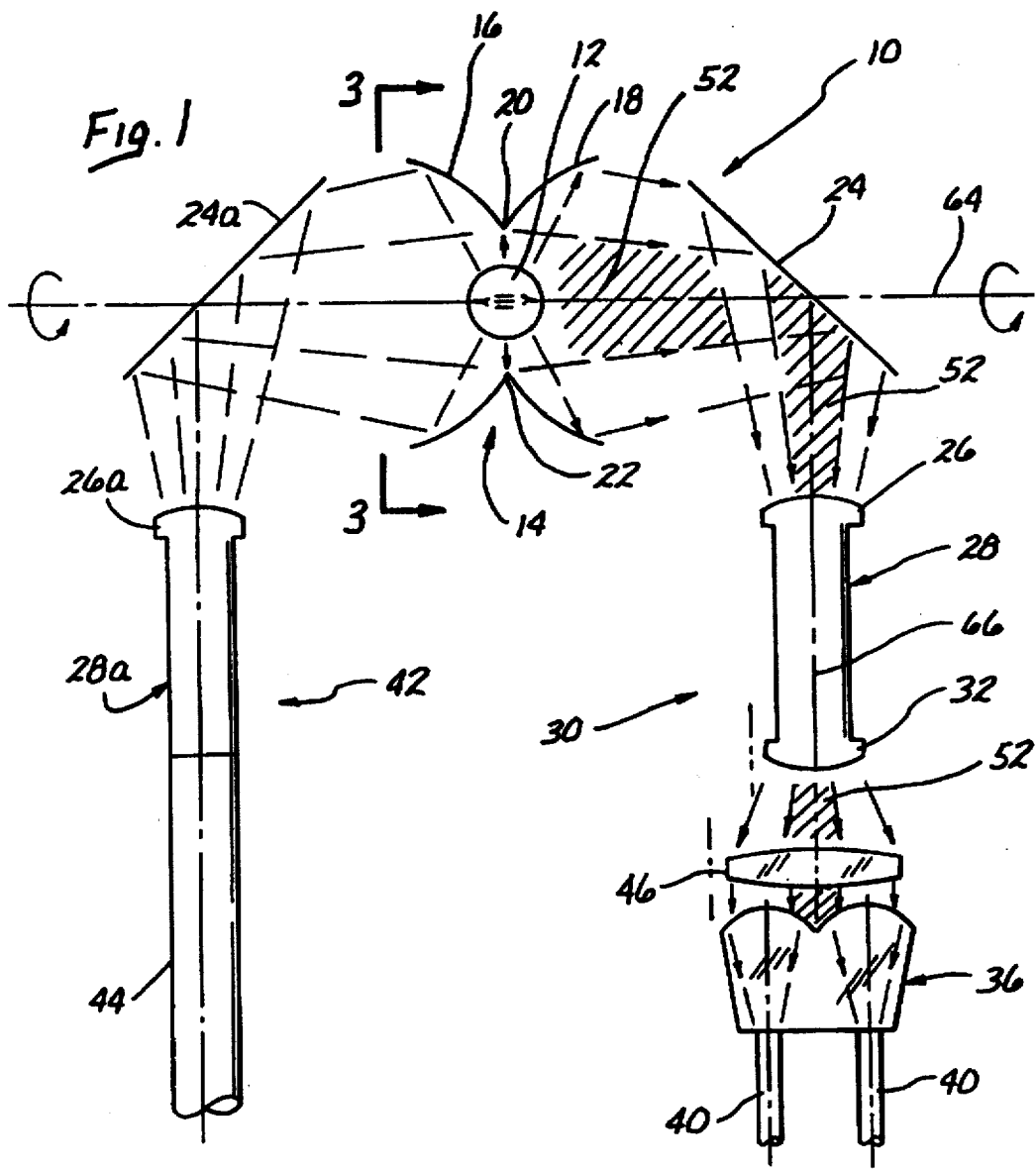
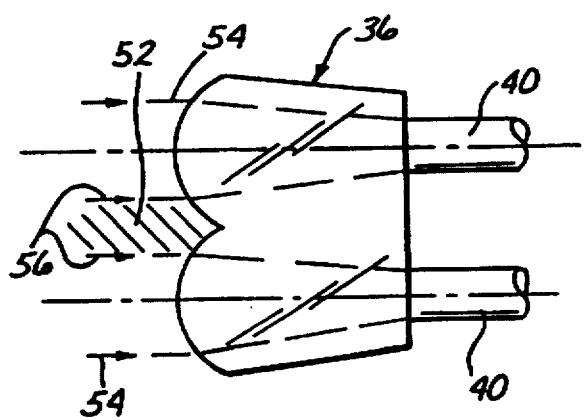

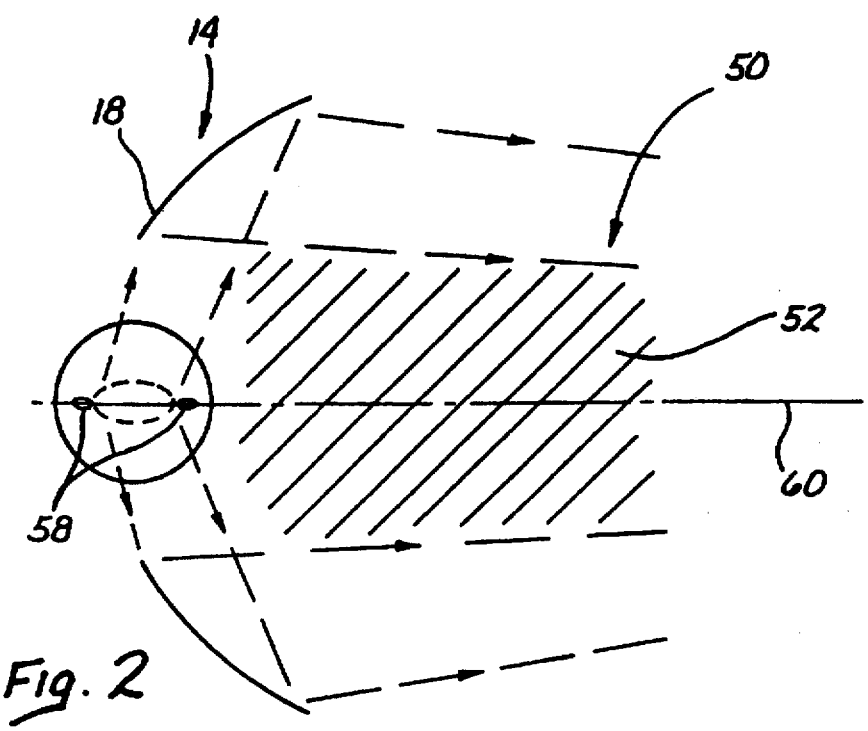
Fig. 2
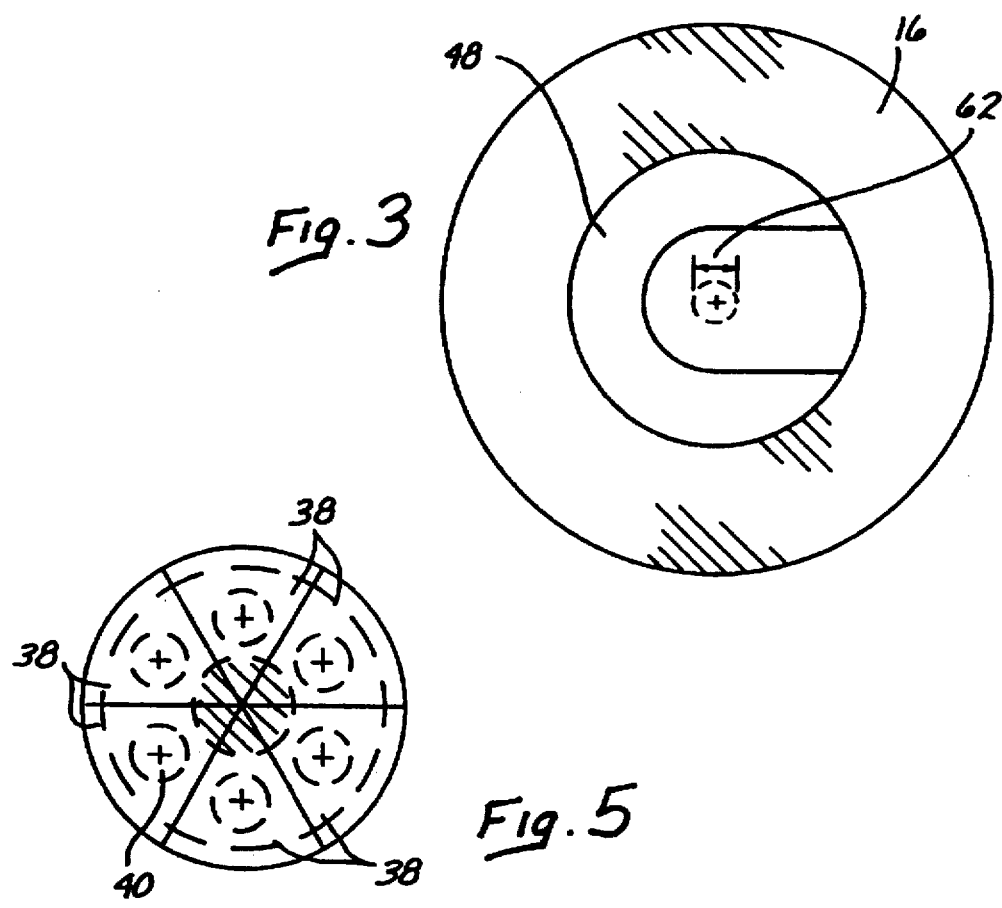
Fig. 3
Fig. 5

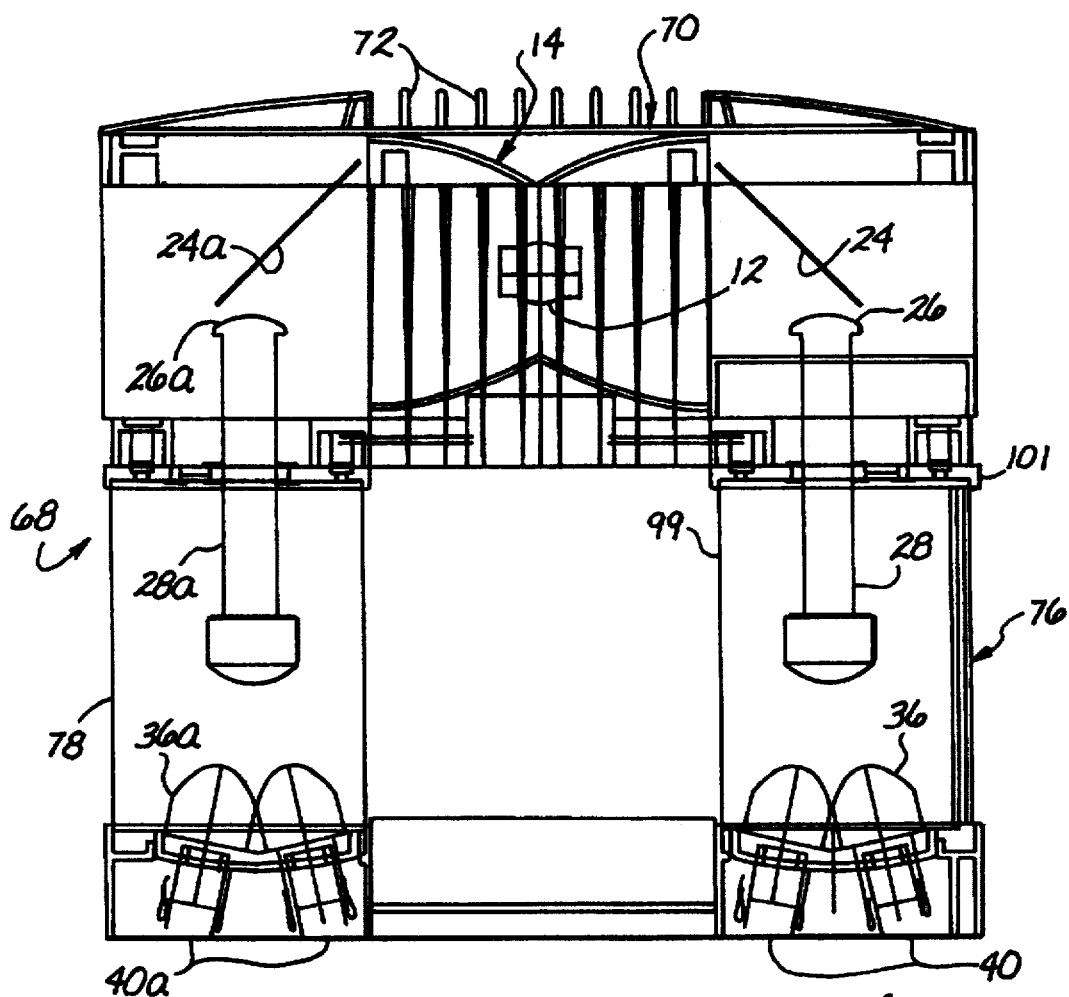
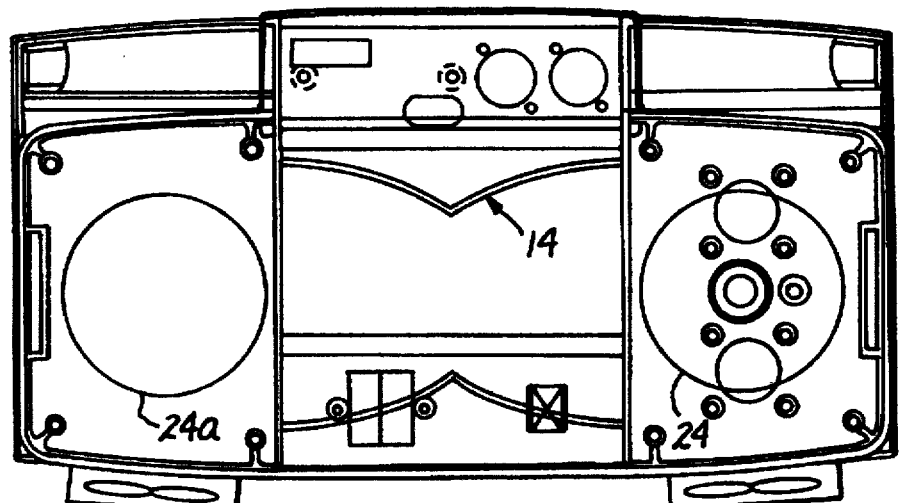

MULTIPORT ILLUMINATOR MECHANICAL DESIGN FOR MACRO-FIBERS

This application is a continuation-in-part of U.S. application Ser. No. 08/599,970 filed on Feb. 14, 1996 and entitled OPTICAL COUPLER; which is a continuation-in-part of U.S. application Ser. No. 08/459,613 filed on Jun. 02, 1995 and entitled MULTIPORT ILLUMINATOR FOR MACRO-FIBERS, now U.S. Pat. No. 5,706,376; which is a continuation-in-part of U.S. application Ser. No. 08/374,163 filed on Jan. 17, 1995 and entitled OPTICAL FIBER COUPLER USING SEGMENTED LENSES, now U.S. Pat. No. 5,559,911.

BACKGROUND OF THE INVENTION

Large diameter fiber optics, often referred to as "flexible light pipes", are well known in the art, and typically comprise a single, solid core fiber which is surrounded by a cladding layer and a sheath or shielding layer. The core is the portion of a light pipe which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter optical fibers, which are typically used to transmit information in relatively complex control systems, these large diameter "light pipes" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), or jail cells. They are particularly advantageous in that only a single centralized illumination system must be maintained, rather than a plurality of individual lights.

There are problems, however, in implementing state of the art light pipe illumination systems because of the difficulty of illuminating a plurality of light pipes from a single illumination source, as is discussed in related application Ser. No. 08/374,163 now U.S. Pat. No. 5,539,911. In order to maximize efficiency, the optical fibers must be bundled as closely as possible, to ensure the maximum ratio of core area (the part of each light pipe which actually transmits light) to total area. However, bundling the large diameter light pipes together in order to illuminate them from the single illumination source is difficult to do efficiently. Each of the individual light pipes are round and thus have a great deal of space between them due to the cladding and shielding layers. To obtain maximum efficiency, it is desirable to illuminate only the core of each of the bundled optical fibers, but this is impossible using state of the art bundling techniques. Necessarily, if the light from the source of illumination is spread across the array of optical fibers, it will illuminate not only the cores of the optical fibers, but also the cladding layers and shielding layers. Furthermore, the voids between the optical fibers, which are inevitable because of the fibers' round dimensions, also are impacted by the light from the illumination source. All of the light falling upon any element other than the cores is wasted, and becomes an efficiency loss, since it will not be transmitted by the fibers. Additionally, packing the fibers so closely together creates problems such as mechanical difficulties in configuring and accommodating the illumination system and difficulties encountered in attempting to replace one of the individual bundled fibers. This design also typically results in color variation between fibers unless techniques are specifically employed to prevent this problem.

One prior art solution to this problem has been to eliminate the sheathing and cladding layers about each optical fiber, in order to reduce the area across the bundled array of fibers which does not transmit light. However, there is still a packing factor problem because the optical fibers are round, and there are other physical disadvantages in eliminating those layers. Thus, this solution is unsatisfactory for most applications.

Another problem associated with prior art illuminator designs results from high temperatures generated by the illumination source. These high temperatures may shorten the life span of electronics and/or damage optical or other components within the system. Additionally, prior illumination system devices may not be adequately sealed, thus facilitating introduction of dust into the system and onto the optical components therein.

SUMMARY OF THE INVENTION

This invention efficiently couples the light originating from an arc lamp, or similar source, into a multiplicity of flexible macroscopic fibers. Such a system is to be used in transmitting illumination from a central source to a variety of remote locations. The combination of the several elements of the inventive system results in a very efficient transfer of the energy of the light source to the fibers. The system also provides a very flexible mechanical means for distributing the energy to the fibers and to the remote locations at which the light is used.

The present invention, together with additional features and advantages thereof, may best be understood by reference to the following description taken in connection with the accompanying illustrative drawings.

BRIEF DESCRIPTION OF THE DRAWINGS

FIG. 1 is a schematic view of a preferred embodiment of the inventive optical system;

FIG. 2 is an enlarged schematic view of the lamp and right portion of the dual reflector illustrated in FIG. 1;

FIG. 3 is an end view of the dual reflector, taken along lines 3—3 in FIG. 1;

FIG. 4 is a schematic side view illustrating the multi-sector lens which forms a part of the optical system shown in FIG. 1;

FIG. 5 is an end view of the multi-sector lens shown in FIG. 4;

FIG. 6 is a schematic top view of an inventive fiber illumination unit, illustrating a housing containing the system elements shown in FIG. 1; and FIG. 7 is a schematic front view of the unit illustrated in FIGS. 6 and 7.

DETAILED DESCRIPTION OF THE PREFERRED EMBODIMENT

Referring now more particularly to the drawings, an optical system 10 is illustrated which includes a compact light source 12, which may comprise an arc lamp or similar source. The light source 12 is placed at the focus of a dual curved reflector 14, which comprises two reflector portions 16 and 18 which are disposed in a back-to-back fashion. In each reflector portion 16, 18, the center or vertex region of the reflector has been removed, as illustrated, and the two reflector portions are joined at intersection points 20 and 22.

Light emitted from the light source 12, which is preferably a 500 watt source, is reflected by the dual reflector 14, as illustrated by the lines of incidence shown in FIG. 1, in two opposing directions, and is then directed through an angle of approximately 90 degrees (or any other desired angle) by each of two flat reflectors or fold mirrors 24 and 24a, respectively. Then, each focussed beam of light impinges on a lens end 26, 26a of a circular light pipe 28, 28a. Each of the two circular light pipes 28, 28a is comprised of a transparent material, such as glass or clear plastic, and is adapted to integrate the light beam by means of multiple reflections within the light pipe.

On the right side of the system, or right channel 30, as illustrated, the light beam emerges from the light pipe 28 at an exit lens face 32.The diverging beam from the light pipe 28 is then collimated and split into a number of separate focussed beams by means of a multi-sectored lens 36 (FIGS. 1, 4 and 5). Each of the lens sectors 38 (FIG. 5) focusses onto the core of a corresponding output fiber 40.

The optical system for the left beam focussed by the dual reflector 14 through the left channel 42 can be essentially the same as that described with respect to the right channel 30, or some different features may be incorporated into the left channel. For example, the right channel 30 might have a sector lens accommodating ten output fibers while the left channel might only couple to a single large fiber or multi-fiber bundle 44.

Another feature of the invention, as illustrated in FIG. 1, is to incorporate a rotating color wheel 46 at the exit of the light pipe 28 or, alternatively, in front of the sector lens 36. Both locations are shown in the figure, though typically only one or the other of the color wheels 46 would actually be employed at one time. With the color wheel 46 at the light pipe exit, the color of the light to all of the fibers is the same and changes simultaneously as the wheel rotates. With the wheel near the entrance to the sector lens, the colors to each fiber are different and can change at different rates depending on the pattern of the wheel. These various color controls are useful in pool lighting, signs and other applications.

The high efficiency of this illumination system derives from the special design of a number of its elements working singly and in combination. The lamp 12 is preferably selected to have small arc dimensions so that it will couple into fibers of relatively small diameter (preferably 3 mm to 10 mm). The reflector 14 consists of two axially symmetrical curved halves or portions 16 and 18, with the lamp centered at their matching plane. This arrangement makes use of the very efficient collection properties of the low magnification section of the ellipsoidal (or near ellipsoidal) reflector shape. The large hole 48 in the center of each reflector half (FIG. 3) results in a focussed light beam with a ring-shaped cross section. The light entering the hole in the reflector is not lost but passes into the opposite reflector half and is focussed into the second focussed beam. This reflector arrangement efficiently generates a ring cross-section beam which is very useful in reducing the radial aperture required of each of the sector lenses 38. FIG. 2 shows a section through the right portion 18 of the dual reflector 14 indicating how the ring-shaped beam 50 is generated. The ring-shaped beam 50, wherein the darkened center portion 52 is represented by cross-hatching, is preserved through the light pipe 28 and through the collimating lens 34 (see FIG. 1). As shown best in FIG. 4, the ring-shaped beam impinges on the sector lens as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter fibers, thus unexpectedly increasing the efficiency of the system. The minimum fiber diameter is controlled by the need to match the output beam divergence to the numerical aperture of the fiber.

Another feature of the invention is the orientation of the arc lamp 12. As illustrated particularly in FIG. 2, the lamp is shown at the focal point of the dual reflector 14. The long dimension of the arc discharge of the lamp 12, as defined by the position of the electrodes 58, is oriented so as to be substantially parallel and coincident with the reflector symmetry axis 60. The efficiency of transmission of the optical system is greatly influenced by the arc orientation with respect to the reflector because of the high length to diameter ratio (typically about 5×) of the arc. By aligning the lamp as described, the small dimension 62 of the arc (FIG. 3) becomes the controlling parameter in defining the minimum permissible output fiber diameter for efficient coupling. Designing for minimum output fiber diameter permits larger fibers to also be coupled efficiently.

Although six equal lens' sectors 38 are illustrated in FIG. 5, the sector lens 36 can have as few as two and up to about twelve sectors. Also, the sectors need not be equal in area, since in some applications it may be desirable to deliver different amounts of light to different locations. The sector lens as a means of splitting the incident beam has a major advantage over currently used bundled fibers in that the sector lens array separates the fibers from each other (FIGS. 4 and 5), thereby permitting easy installation and removal of individual fibers.

The fold reflector 24, 24a may serve a multiple function of folding mirror and heat rejecting mirror. As a folding mirror, it also provides the ability of rotating the entire output optical system around a mechanical axis 64, as best shown in FIG. 1. This feature is very useful in allowing great flexibility in positioning the direction in which the fibers emerge from the unit. Independent rotation of the fold mirrors 24, 24a on either side of the lamp gives additional flexibility of output fiber location.

As described above, the circular light pipe 28 (as well as light pipe 28a) is used to integrate the angular distribution of the light around the pipe axis 66. This is advantageous since it allows the light output of each fiber to be identical (which is usually desired), because the angular light distribution from the lamp is not generally uniform. Additionally, the metal-halide type of arc lamp which is preferably used typically has some color differences in the angular distribution which also need to be integrated out in order to avoid undesirable color differences in output between fibers. Field lens 32 (FIG. 1) is preferably employed on the light pipe ends to constrain the light inside the pipe so that it is totally reflected internally. Mechanically, the field lens portions 26 and 32 of the light pipe are larger in diameter than the pipe section itself in order to provide a loss-free means of mounting the light pipe. Anything touching the light pipe surface will bleed off some of the internally reflected light unless the pipe is clad, which is a disadvantageous approach since it reduces its numerical aperture and increases its cost.

The complete fiber illumination unit 68 of the presently preferred embodiment, having a modular dual-port construction, is illustrated schematically in FIGS. 6 and 7. The first module 70 of the unit contains the light source 12 and its dual reflector 14, together with all other associated electrical wiring, etc. The first module 70 further comprises the two fold mirrors 24 and 24a, and portions of the two light pipes 28 and 28a. Two second modules 76 and 78 house the remaining portions of the two light pipes 28 and 28a. The two second modules 76 and 78 further house the sector lenses 36 and 36a that feed into the fibers 40 and 40a. The first module 70 and two second modules 76 and 78 preferably comprise metal. Fasteners 99 removably join the second modules 76 and 78 to the first module 70. An engineering plastic 101, which preferably comprises Ryton, is preferably coupled between the first module 70 and each of the two second modules 76 and 78. This engineering plastic 101 thermally isolates the first module 70, which generally operates at a relatively high temperature because of the light source 12, from the two second modules 76 and 78. The first module 70 which comprises heat dissipating fins 72, is able to operate at a relatively high temperature, which is approximately between 70 and 80 degrees Celsius in the presently preferred embodiment. In one implementation of the presently preferred embodiment, a 500 watt lamp is used for the light source, and vents and fans 112 (FIG. 7) are used to blow air from intake vents underneath one end of the first module 70 across the light source 12 to exhaust vents 115 underneath the opposite end of the first module 70.

With a 150 watt light source, no fan is required and the first module 70 may be sealed. Sealing of the first module 70 protects the optical elements within the first module 70 from dust and other contaminants, according to the present invention. In either configuration, regardless of whether a 150 watt light source or a 500 watt light source is used, the first module 70 can be operated in a wet location, such as outdoors where it might be exposed to rain or sprinklers. The lower wattage light source 12 may facilitate a completely sealed first module 70 which may be used in unventilated spaces such as underground enclosures. The two side modules 76 and 78 may also be sealed from dust, since they are not subject to high temperatures generated from the light source 12. Thus, the two side modules 76, 78 are adapted for operating at lower temperature environments, such as ambient temperature, and are thus capable of reliably housing electronics and dust-free optics therein. The light pipes 28, 28a optically connect the first module 70 to the second module 76, 78.

As discussed in connection with FIG. 1, although the two second modules 76 and 78 are substantially identical, there is no requirement that they be so. Although color wheels 46 (FIG. 1) may used, the presently preferred embodiment of FIGS. 6 and 7 do not use color wheels. Having different sector lenses on either the two second modules 76, 78 allows coupling to a different number of fibers on the two sides.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

I claim:

1. An optical fiber illumination system, comprising:
   a first module containing a light source and a dual reflector; and
   a second module containing a multi-sectored lens and at least one output fiber, the second module being thermally insulated from the first module.

2. The optical fiber illumination system as recited in claim 1, the first module further comprising a fold mirror for directing light from the dual reflector toward the second module.

3. The optical fiber illumination system as recited in claim 2, the second module further comprising a circular light pipe for receiving light from the fold mirror.

4. The optical fiber illumination system as recited in claim 3, the circular light pipe extending between both the first module and the second module to thereby optically couple the first module to the second module.

5. The optical fiber illumination system as recited in claim 4, the second module being removably attachable to the first module.

6. The optical fiber illumination system as recited in claim 5, the first module and second modules comprising metal.

7. The optical fiber illumination system as recited in claim 6, further comprising an insulating layer disposed between the first module and the second module.

8. The optical fiber illumination system as recited in claim 7, the insulating layer comprising an engineering plastic.

9. An optical fiber illumination system, comprising:
   a first module containing a light source and a dual reflector;
   at least one second module containing a multi-sectored lens and at least one output fiber, the second module being thermally insulated from the first module; and
   a layer of thermal insulation disposed between the first module and the second module.

10. The optical fiber illumination system as recited in claim 9, the layer of thermal insulation being integrally formed onto one of the first module and the second module.

11. The optical fiber illumination system as recited in claim 10, the first module and the second module comprising metal, and the layer of thermal insulation comprising an engineering plastic.

12. The optical fiber illumination system as recited in claim 11, the layer of thermal insulation attenuating an introduction of thermal energy from the first module to the second module.

13. The optical fiber illumination system as recited in claim 12, the second module further comprising electronics, wherein the electronics are shielded from relatively high temperatures generated by the light source in the first module.

14. The optical fiber illumination system as recited in claim 12, the second module further comprising a seal for sealing the second module from dust.

15. The optical fiber illumination system as recited in claim 14, the optics within the second module being protected by the seal from dust.

16. The optical fiber illumination system as recited in claim 9, the second module containing no electrical wiring.

17. The optical fiber illumination system as recited in claim 16, the second module being rotatable with respect to the first module.

18. The optical fiber illumination system as recited in claim 17, wherein there are two second modules containing substantially identical optical system components.

19. The optical fiber illumination system as recited in claim 9, wherein there are two second modules containing substantially different optical system components.

20. An optical fiber illumination system, comprising:
   a first module containing a light source and a dual reflector, the light source adapted for emitting light and the dual reflector being adapted for reflecting the emitted light into a light pipe; and
   at least one second module containing a multi-sectored lens and at least one output fiber, the multi-sectored lens being adapted for receiving the reflected light from the light pipe and for focussing the light into the at least one output fiber, the second module being thermally insulated from the first module.

21. The optical fiber illumination system as recited in claim 20, the light pipe being disposed between the first module and the second module to thereby optically connect the first module to the second module.

* * * * *